(12) United States Patent
D'Amato et al.

(10) Patent No.: US 9,382,848 B2
(45) Date of Patent: Jul. 5, 2016

(54) SYSTEM AND METHOD FOR START-UP OF A COMBINED CYCLE POWER PLANT

(71) Applicant: General Electric Company, Schenectady, NY (US)

(72) Inventors: Fernando Javier D'Amato, Niskayuna, NY (US); Rodrigo Lopez-Negrete de la Fuente, Saratoga Springs, NY (US); Aditya Kumar, Schenectady, NY (US); Emrah Biyik, Bornova (TR)

(73) Assignee: General Electric Company, Niskayuna, NY (US)

( * ) Notice: Subject to any disclaimer, the term of this patent is extended or adjusted under 35 U.S.C. 154(b) by 620 days.

(21) Appl. No.: 13/840,531

(22) Filed: Mar. 15, 2013

(65) Prior Publication Data
US 2014/0260288 A1    Sep. 18, 2014

(51) Int. Cl.
| G05D 3/12 | (2006.01) |
| F02C 9/00 | (2006.01) |
| F01K 13/02 | (2006.01) |
| F01K 23/10 | (2006.01) |

(52) U.S. Cl.
CPC . *F02C 9/00* (2013.01); *F01K 13/02* (2013.01); *F01K 23/101* (2013.01); *F05D 2220/72* (2013.01); *F05D 2260/85* (2013.01); *Y02E 20/16* (2013.01)

(58) Field of Classification Search
CPC ....... Y02E 20/16; F01K 13/02; F01K 23/101; F05D 2260/85; F05D 2220/72; F02C 9/00
USPC ............................................ 700/288; 60/722
See application file for complete search history.

(56) References Cited

U.S. PATENT DOCUMENTS

| 4,578,944 | A | * | 4/1986 | Martens ................ F01K 23/105 122/7 B |
| 5,794,431 | A | * | 8/1998 | Utamura ............... F01K 23/101 60/39.182 |
| 6,055,803 | A | | 5/2000 | Mastronarde |
| 7,107,774 | B2 | | 9/2006 | Radovich |
| 8,352,148 | B2 | | 1/2013 | D'Amato et al. |

(Continued)

OTHER PUBLICATIONS

"Heavy Duty Gas Turbine Products"; GE Energy; 2009; 24 Pages.
Grumann et al.; "Improvement of Operational Efficiency Based on Fast Startup Plant Concepts"; Siemens AG Energy Solutions; XXIst World Energy Congress, Montreal, Sep. 2010; pp. 1-14.
Fernando Javier D'Amato, et al.; "Systems and Methods for Predicting Transient Operational Characteristics of a Power Plant"; Pending U.S. Appl. No. 13/292,907, filed Nov. 9, 2011; 24 Pages.

*Primary Examiner* — Mohammad Ali
*Assistant Examiner* — Ziaul Karim
(74) *Attorney, Agent, or Firm* — Ann M. Agosti

(57) ABSTRACT

In accordance with one aspect of the present technique, a method is disclosed. The method includes modifying one or more operational parameters of a gas turbine (GT) to increase an exhaust gas temperature above a standard start-up temperature. The method also includes receiving at least one of GT operational data, heat recovery steam generator (HRSG) operational data, and steam turbine (ST) operational data from a plurality of sensors. The method further includes predicting a ST roll-off time based on at least one of the GT operational data, the HRSG operational data, and the ST operational data. The method further includes modifying the one or more operational parameters of the GT to satisfy one or more ST roll-off permissives at the predicted ST roll-off time.

14 Claims, 4 Drawing Sheets

(56) References Cited

U.S. PATENT DOCUMENTS

| | | |
|---|---|---|
| 2005/0235649 A1 | 10/2005 | Baer et al. |
| 2006/0123767 A1* | 6/2006 | Briesch .................. F01K 9/00 60/39.182 |
| 2007/0113562 A1 | 5/2007 | Tomlinson et al. |
| 2009/0158738 A1 | 6/2009 | Hu et al. |
| 2009/0217665 A1* | 9/2009 | Holzhauer .............. F01D 17/00 60/645 |
| 2010/0100248 A1 | 4/2010 | Minto et al. |
| 2010/0162721 A1 | 7/2010 | Welch et al. |
| 2012/0233978 A1 | 9/2012 | Chillar et al. |

* cited by examiner

1

SYSTEM AND METHOD FOR START-UP OF A COMBINED CYCLE POWER PLANT

BACKGROUND

The subject matter disclosed herein generally relates to combined cycle (CC) power plants. More specifically, the subject matter relates to a system and method for start-up of a CC power plant.

CC power plants are power generation units that can include gas turbines (GT), heat recovery steam generators (HRSG), and steam turbines (ST). For illustrative purposes, the GT can be operated to generate power and the exhaust gas generated during the GT operation is channeled to the HRSG. The thermal energy of the exhaust gas is used to generate steam in the HRSG. The generated steam is channeled into the ST to further generate power.

The start-up of the CC power plant is usually characterized by drastic transients that can affect the life of the CC power plant components and the amount of emissions (i.e., Nitrogen Oxide, carbon monoxide, hydrocarbons, or the like) released into the atmosphere. During start-up of the CC power plant, the temperatures of the CC power plant components (for example, the ST rotors) are often low. If the temperature of the steam channeled into the ST is higher than the temperature of the ST rotors, the ST rotors may get damaged. Thus, standard start-up procedures operate the GT at a low load (i.e., power generated by the GT) in order to generate steam at lower temperatures and prevent damage to the CC power plant components. But, operating the GT at lower loads has other issues, for example, higher level of emissions, longer waiting time to generate steam in the HRSG, or the like.

Thus, there is always a need for an enhanced system and method for start-up of a CC power plant.

BRIEF DESCRIPTION

In accordance with one embodiment, a method is disclosed. The method includes modifying one or more operational parameters of a gas turbine (GT) to increase an exhaust gas temperature above a standard start-up temperature. The method also includes receiving at least one of GT operational data, heat recovery steam generator (HRSG) operational data, and steam turbine (ST) operational data from a plurality of sensors. The method further includes predicting a ST roll-off time based on at least one of the GT operational data, the HRSG operational data, and the ST operational data. The method further includes modifying the one or more operational parameters of the GT to satisfy one or more ST roll-off permissives at the predicted ST roll-off time.

In accordance with another embodiment, a system is disclosed. The system includes a gas turbine (GT), a heat recovery steam generator (HRSG), a steam turbine (ST) and a computing device. The computing device is configured to modify one or more operational parameters of the GT to increase an exhaust gas temperature above a standard start-up temperature. The computing device further receives at least one of GT operational data, heat recovery steam generator operational data, and steam turbine operational data. The computing device further predicts a ST roll-off time based on at least one of the GT operational data, the HRSG operational data, and the ST operational data. The computing device then modifies the one or more operational parameters of the GT to satisfy one or more ST roll-off permissives at the predicted ST-roll off time.

DRAWINGS

These and other features, aspects, and advantages of the present invention will become better understood when the following detailed description is read with reference to the accompanying drawings in which like characters represent like parts throughout the drawings, wherein.

Figure 3:
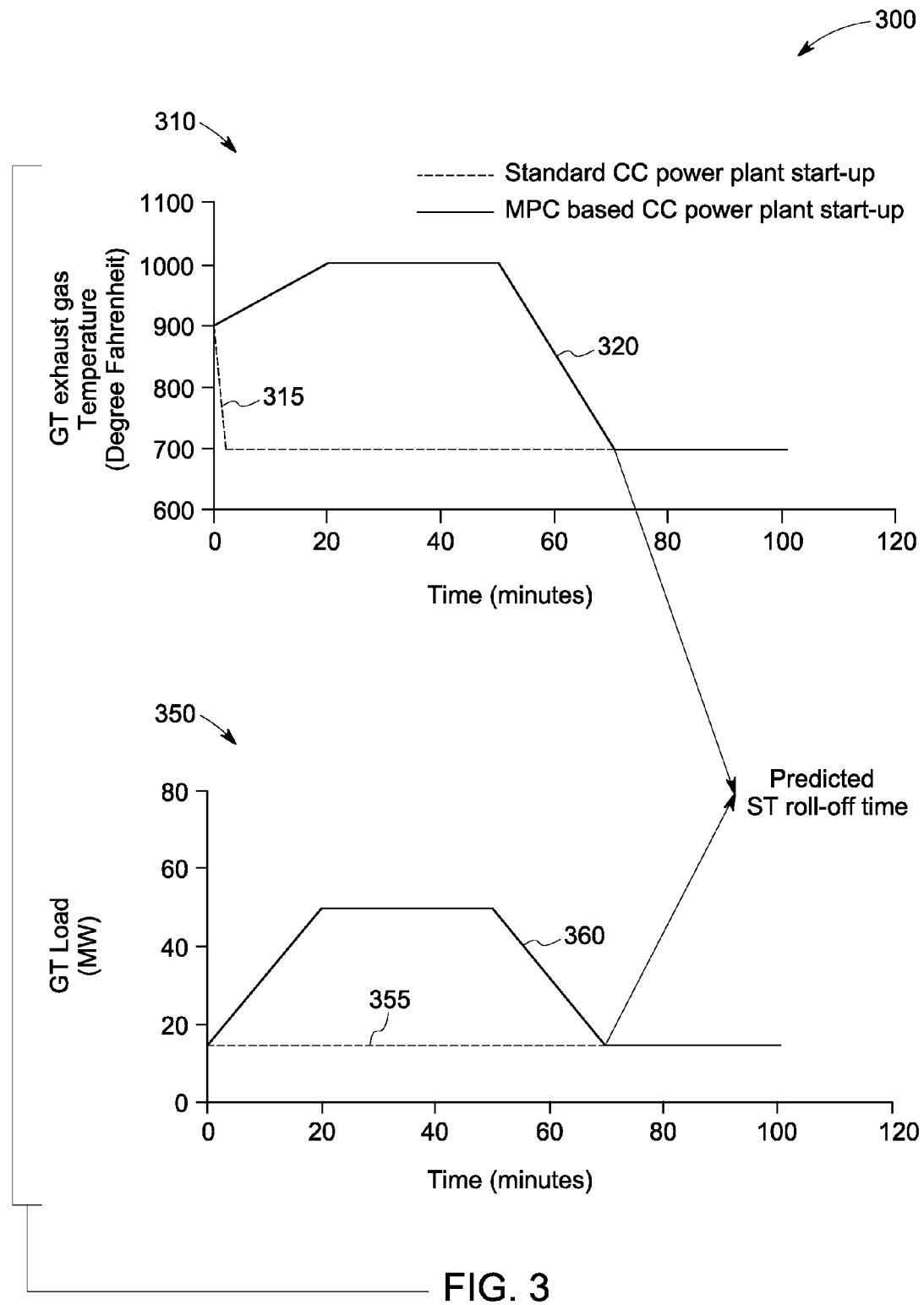
Figure 4:
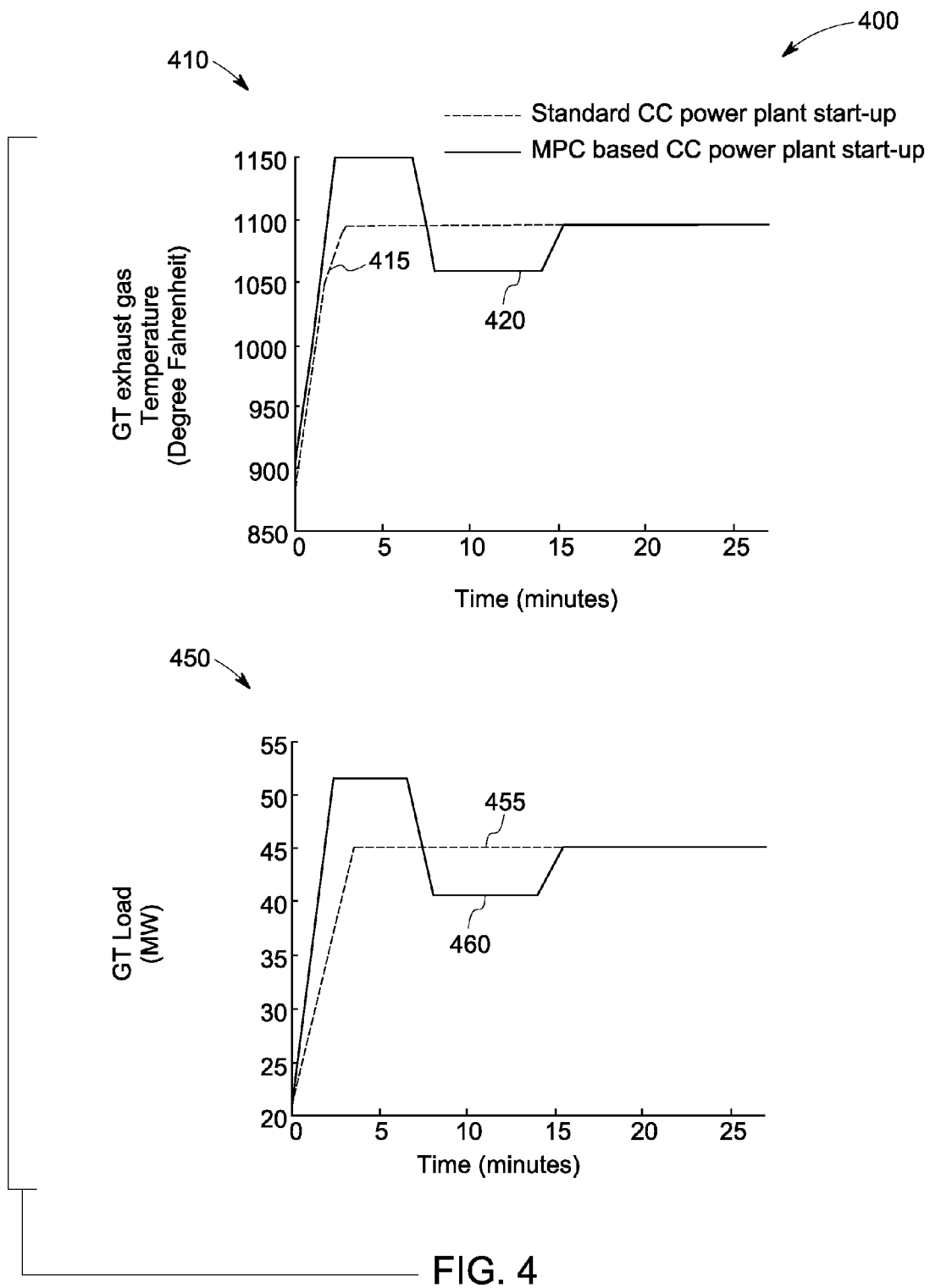

FIG. 3 is a graph depicting a comparison between operational data of a standard CC power plant start-up method and an exemplary model predictive control (MPC) based CC power plant start-up method according to one embodiment; and FIG. 4 is a graph depicting a comparison between operational data of a standard CC power plant start-up method and an exemplary model predictive control (MPC) based CC power plant start-up method according to another embodiment.

DETAILED DESCRIPTION

Figure 1:
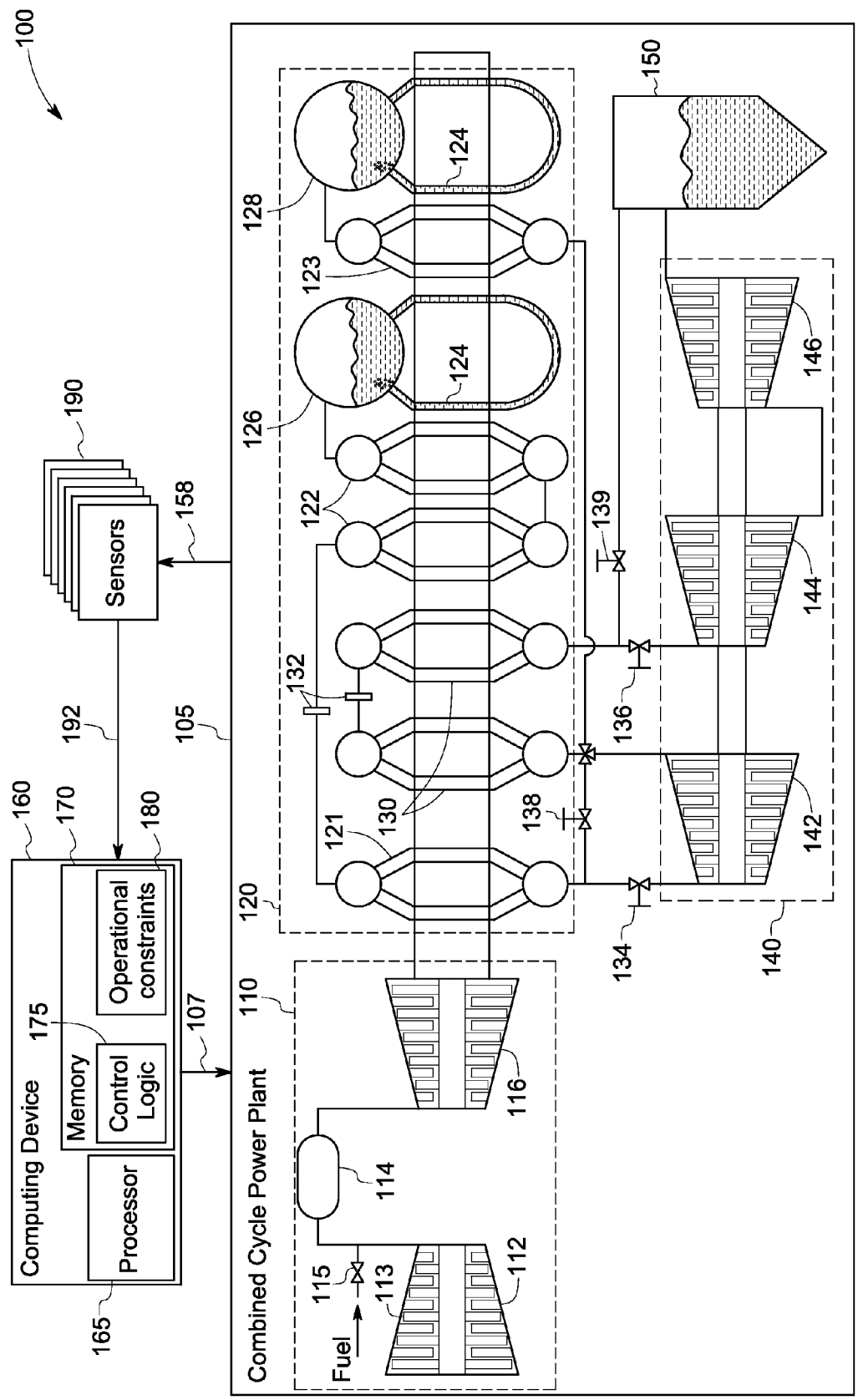
FIG. 1 is a block diagram illustrating a system for start-up of a combined cycle (CC) power plant according to one embodiment.

A system and method for start-up of a combined cycle power (CC) plant is described. FIG. 1 illustrates a system 100 for the start-up of a CC power plant according to one embodiment. The system 100 includes a CC power plant 105, a computing device 160, and a plurality of sensors 190. In the illustrated embodiment, the computing device 160 is communicatively coupled to the CC power plant 105 and the plurality of sensors 190 via signal lines 107 and 192 respectively. Similarly, the CC power plant 105 is communicatively coupled to the plurality of sensors 190 via a signal line 158. Although, one computing device 160 and one CC power plant 105 are illustrated in FIG. 1, in other embodiments, any number of computing devices 160 and any number of CC power plants 105 can be communicatively coupled with each other. Although in the illustrated embodiment, the CC power plant 105, the computing device 160, and the plurality of sensors 190 are coupled via signal lines 107, 158, and 192, in other embodiments, the devices can be coupled wirelessly via a network (not shown). In such embodiments, the system 100 may further include transceivers, centralized servers, cloud storage or the like, for communicating information.

In the illustrated embodiment, the CC power plant 105 is a power generation unit that includes a gas turbine (GT) 110, a heat recovery steam generator (HRSG) 120, a steam turbine (ST) 140, and a condenser 150. The GT 110 includes a compressor 112, a combustor 114, and a turbine 116. The turbine 116 is coupled to a generator (not shown). During operation, air entering the GT 110 is compressed by the compressor 112 and is then channeled to the combustor 114. The amount of air entering the compressor 112 is typically controlled using inlet guide vanes 113. The combustor 114 receives fuel from a fuel source (not shown) and mixes the fuel and air to ignite the mixture and generate a hot combustion gas. The amount of fuel entering the combustor 114 is typically controlled using a fuel valve 115. The combustion gas is channeled to the turbine 116 and expanded to impart rotations of the rotors thereof. The rotation of the turbine 116 causes the generator (not shown) to generate electricity. Exhaust gases are discharged from the turbine 116 and channeled into the HRSG 120.

The HRSG 120 is operated to capture thermal energy of the exhaust gases and generate steam. In the illustrated embodiment, the HRSG 120 includes a plurality of heat exchangers, a high pressure (HP) drum 126, and a low pressure (LP) drum 128. Although, the illustrated embodiment includes a HP drum 126 and a LP drum 128, in other embodiments, the HRSG 120 can also include an intermediate pressure (IP) drum. The plurality of heat exchangers include super heaters 121, 122, 123, evaporators 124, re-heaters 130, and economizers (not shown). The HP drum 126, the LP drum 128, and the evaporators 124 contain water. During operation, the thermal energy of the exhaust gases boils the water in the evaporators 124 and generates steam. The steam collected in the HP drum 126 and the LP drum 128 is channeled into the super heaters 121, 122, 123. The steam is further heated up in the super heaters 121, 122, 123. The HRSG 120 also includes attemporators 132 that can be operated to spray water. The steam is then channeled into the ST 140 if one or more ST roll-off permissives are satisfied.

The ST roll-off permissives are the conditions are the required conditions prior to channeling steam into the ST 140. The ST roll-off permissives in this embodiment include a minimum pressure condition, a minimum flow condition, and a temperature matching condition. The minimum pressure condition is satisfied if the pressure of the steam generated in the HRSG 120 exceeds a threshold pressure level. Similarly, the minimum flow condition is satisfied if the rate of flow of the steam generated in the HRSG 120 exceeds a threshold rate of flow level. Prior to channeling the steam into the ST 140, the minimum pressure and flow conditions need to be satisfied in order to efficiently accelerate and rotate the rotors of the ST 140 without stopping. The temperature matching condition is satisfied if the temperature of the steam generated in the HRSG 120 matches the temperature of the ST components (for example, the ST rotors) in order to prevent damage to the ST components. In one embodiment, the ST roll-off permissives are defined by an administrator of the CC power plant 105.

In the illustrated embodiment, the ST 140 includes a HP turbine 142, an intermediate pressure (IP) turbine 144, and a LP turbine 146. During operation, the steam received from the HRSG 120 rotates the rotors (not shown) of the HP turbine 142, the IP turbine 144, and the LP turbine 146. The rotation of these rotors (not shown) causes a generator (not shown) coupled to the ST 140 to generate electricity. The steam from the LP turbine 146 is then channeled into the condenser 150. The condenser 150 is typically operated to condense the steam received from the LP turbine 146 to form water.

The CC power plant 105 also includes a plurality of valves to regulate the flow of steam. The plurality of valves include a control valve 134, an intercept valve 136, and bypass valves 138, 139. The control valve 134 is operated to regulate the flow of steam from the super heater 121 into the HP turbine 142. The intercept valve 136 is operated to regulate the flow of steam from the re-heaters 130 to the IP turbine 144. The bypass valve 138 is operated to regulate the flow of the steam from super heater 121 to the re-heaters 130. The bypass valve 139 is operated to regulate the flow of steam from the re-heater 130 to the condenser 150.

The sensors 190 are any type of devices that are configured to measure operational data of the CC power plant 105 (i.e., GT operational data, HRSG operational data, and ST operational data). The sensors 190 may include a thermometer, a barometer, a flow meter, a humidity sensing device, or the like. The GT operational data includes, for example, the temperature of the GT exhaust gas, the flow of the GT exhaust gas, or the like. The HRSG operational data includes, for example, the temperature and pressure of the steam in the HRSG 120, the temperature of super heaters 121, 122, 123, the re-heaters 130, the HP drum 126, and the LP drum, the water level in the HP drum 126 and the LP drum 128, the stress levels of the HP drum 126 and the LP drum 128, or the like. The ST operational data includes, for example, the temperature of the rotors, stress level of the rotors, or the like. The sensors 190 are further configured to send the measured operational data of the CC power plant 105 to the computing device 160.

The computing device 160 is configured to control the operations of the CC power plant 105. In one embodiment, the computing device 160 receives the operational data from the sensors 190 and adjusts one or more operational parameters of the CC power plant 105. The operational parameters of the CC power plant 105 include, for example, the inlet guide vanes 113, the fuel valve 115, the control valve 134, the intercept valve 136, the bypass valves 138, 139, the attemporators 132, or the like. In the illustrated embodiment, the computing device 160 includes a processor 165 and a memory 170.

The processor 165 may include an arithmetic logic unit, a microprocessor, a microcontroller, general purpose controller or other processor arrays to perform computations, and retrieve data stored on the memory 170. In another embodiment, the processor 165 is a multiple core processor. The processor 165 processes data signals and may include various computing architectures including a complex instruction set computer (CISC) architecture, a reduced instruction set computer (RISC) architecture, or an architecture implementing a combination of instruction sets. The processing capability of the processor 165 may be limited to supporting the retrieval of data and transmission of data. The processing capability of the processor 165 may also perform more complex tasks, including various types of modulating, encoding, and multiplexing. In other embodiments, other processors, operating systems, and physical configurations are possible.

The memory 170 may be a non-transitory storage medium. For example, the memory 170 may be a dynamic random access memory (DRAM) device, a static random access memory (SRAM) device, flash memory or other memory devices. In one embodiment, the memory 170 also includes a non-volatile memory or similar permanent storage device, and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or other non-volatile storage devices.

The memory 170, according to one embodiment, stores the control logic 175 and the operational constraints 180 of the CC power plant 105. In another embodiment, the memory 170 also stores the aforementioned ST roll-off permissives. The operational constraints 180 are typically predefined by, for example, an administrator/operator of the CC power plant 105. In a further example, the operational constraints are adjustable by operator input. The operational constraints 180 include physical constraints on the components of the CC power plant 105, performance constraints of the CC power plant 105, or the like. The physical constraints include, for example: (a) maximum fire temperature (i.e., the representative temperature of the combustion gases in the GT 110); (b) maximum discharge temperature in the compressor 112; (c) maximum temperature of the super heaters 121, 122, 123; (d) maximum steam pressure at the HP drum 126, the LP drum 128 and the super heaters 121, 122, 123; (e) maximum steam temperature in the super heaters 121, 122, 123 and the re-heaters 130; (f) maximum and minimum water level in the HP drum 126 and the LP drum 128; (g) maximum stress levels in the HP drum 126, LP drum 128, the super heaters 121, 122, 123, the evaporators (not shown), the rotors of the HP turbine 142, IP turbine 144; (h) maximum thrust on the rotors of the HP turbine 142, IP turbine 144, LP turbine 146; or the like.

The performance constraints of the CC power plant 105 relate to compliance requirements, for example, maximum level of exhaust gas emissions from GT 110, or the like.

The control logic 175 includes codes and routines for controlling the operations of the CC power plant 105. For example, the control logic 175 adjusts the operational parameters based on the operational data received from the sensors 190. In another example, the control logic 175 adjusts the operational parameters based on the operational data and the operational constraints 180. In one embodiment, the control logic 175 adjusts the operational parameters using models for the GT 110, the HRSG 120, and the ST 140. The models for the GT 110, the HRSG 120, and the ST 140 are, for example, dynamical models that are defined by one or more differential equations. The control logic 175 receives the operational data from the sensors 190 and predicts the future dynamics of the GT 110, the HRSG 120, and the ST 140 based on the respective models. For example, the control logic 175 receives the operational data and predicts when the ST roll-off permissives need to be satisfied. The control logic 175 then implements a control step by adjusting one or more operational parameters of the CC power plant 105 based on the predicted dynamics to ensure a safe and optimal operation of the CC power plant 105. In another embodiment, the control logic 175 includes a model predictive control (MPC) algorithm for receiving operational data, predicting the future dynamics, and implementing control steps. In this embodiment, after each control step, the MPC receives the operational data, forms a real-time optimization problem, and determines an action for the next control step. In a further embodiment, the MPC also adjusts the models' parameters based on the received operational data for maximizing the accuracy of the predicted future dynamics. The MPC is described in further detail in commonly assigned US20070055392, filed 6 Sep. 2005, US20090292436, filed on May 21, 2008, US20090217665, filed on Feb. 20, 2009, and are herein incorporated by reference in entirety. Although, the control logic 175 is described herein with reference to MPC, in other embodiments, other algorithms that enable the CC power plant 105 to function herein may be used. The control logic 175 is further described below with reference to FIG. 2.

Figure 2:
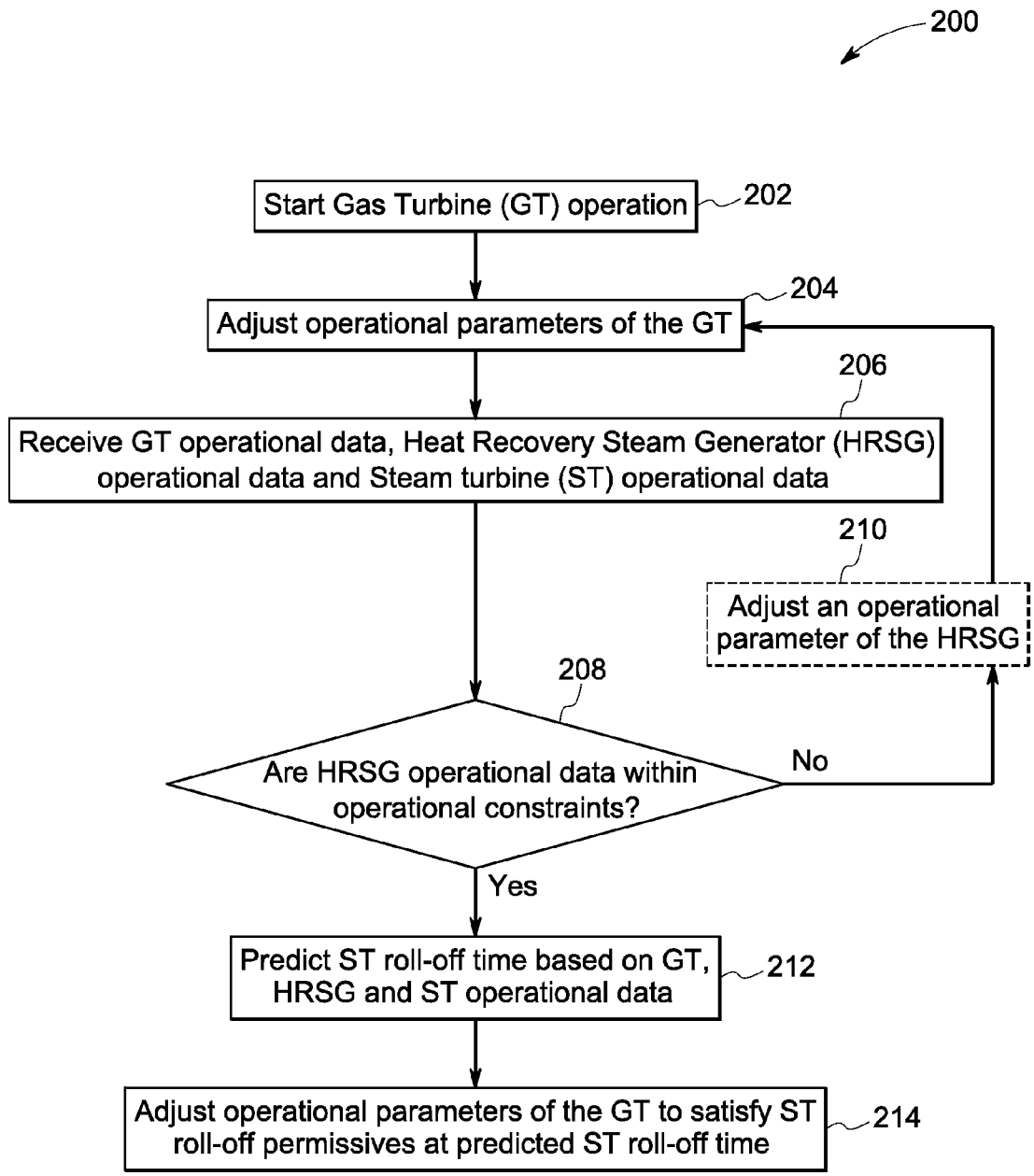
FIG. 2 is a flow diagram illustrating a method for start-up of a CC power plant according to one embodiment.

FIG. 2 is a flow diagram illustrating a method 200 for start-up of a CC power plant according to one embodiment. The illustrated embodiment is an MPC based CC power plant start-up method that begins by starting 202 the GT operation. For example, an administrator/operator of the CC power plant starts the GT operation. The control logic then adjusts 204 the operational parameters of the GT. For example, the control logic sends a signal to the GT to adjust the fuel valve to increase the amount of fuel entering the GT. In one embodiment, the control logic adjusts the operational parameters of the GT to increase the exhaust gas temperature above a standard start-up temperature. In another embodiment, the control logic adjusts the operational parameters of the GT to increase the GT load higher than a standard start-up GT load. The GT load is the power generated by the GT. In yet another embodiment, the control logic adjusts the operational parameters of the GT to increase the exhaust gas flow from the GT above a standard start-up exhaust gas flow. The standard start-up GT load, exhaust gas temperature, and exhaust gas flow are further described below with reference to FIG. 3 and FIG. 4.

The control logic receives 206 GT operational data (for example, the exhaust gas temperature, flow, or the like), HRSG operational data (for example, the temperature and pressure of steam in the super heaters, HP drums, and the LP drum, the water level in the HP and LP drum, temperature of the super heaters, or the like), and the ST operational data (for example, temperature of the ST rotors, or the like) from the sensors. The control logic then retrieves the operational constraints from the memory and determines 208 whether the HRSG operational data are within the operational constraints. For example, the control logic determines whether the steam temperature in the super heaters is within the maximum steam temperature.

In one embodiment, if the control logic determines that the HRSG operational data exceeds the operational constraints, the control logic adjusts 204 the operational parameters of the GT. For example, if the temperature of the super heaters is above the maximum super heater temperature, the control logic adjusts an operational parameter of the GT to lower the temperature of the super heaters. In this embodiment, the control logic may also optionally adjust 210 an operational parameter of the HRSG. For example, the control logic adjusts the attemporators to spray water to lower the temperature of the super heaters below the maximum super heater temperature. In another example, the control logic opens the bypass valves to lower the temperature of the super heaters below the maximum super heater temperature. In a further embodiment, the control logic also determines whether the received GT operational data are within the operational constraints. For example, the control logic determines whether the fire temperature from the sensors is within the maximum fire temperature. In this embodiment, if the fire temperature received exceeds the maximum fire temperature, the control logic adjusts an operational parameter of the GT.

In another embodiment, if the control logic determines that the HRSG operational data is within the operational constraints, the control logic then predicts 212 the ST roll-off time based on the GT, the HRSG, and the ST operational data. For example, the control logic uses MPC to predict the ST roll-off time based on the present temperature and pressure of the steam generated in the HRSG. The ST roll-off time, is referred to as the time at which the steam generated in the HRSG can be channeled into the ST. The control logic then adjusts 214 the operational parameters of the GT to satisfy the ST roll-off permissives (i.e., the temperature matching condition, minimum flow condition, and minimum pressure condition) at the predicted ST roll-off time. For example, if the temperature of the ST rotor is 500 degrees Fahrenheit and the temperature of the steam passing out of the super heater 121 (refer FIG. 1) is 1000 degrees Fahrenheit, the control logic modifies an angle of the inlet guide vanes to channel more air into the GT. The additional air reduces the temperature of the exhaust gas from the GT. The reduction in exhaust gas temperature causes the temperature of the steam passing out of the super heater 121 (refer FIG. 1) to be reduced to 500 degrees Fahrenheit. In such an example, the control logic adjusts the inlet guide vanes (for example, 20 minutes prior to the predicted ST roll-off time) such that the temperature matching condition is satisfied exactly at the predicted ST roll-off time. Similarly, in other examples, the control logic adjusts the operational parameters of the GT to satisfy the minimum pressure condition and minimum flow condition at the predicted ST roll-off time.

FIG. 3 illustrates graphs 300 depicting a comparison between operational data of a standard CC power plant start-up method and an exemplary MPC based CC power plant start-up method according to one embodiment. The illustrated graphs 300 represent the operational data of the CC power plant during a cold start. Typically, in a cold start, the temperatures of the ST components are very low due to a long period (for example, a few days, a week, or the like) of ST inactivity. In the illustrated graph 310, the x-axis is represented by time measured in minutes and the y-axis is represented by GT exhaust gas temperature measured in degrees Fahrenheit. In a standard CC power plant start-up method represented by the curve 315, in order to satisfy the roll-off permissives, the GT is operated such that the exhaust gas temperature is 700 degrees Fahrenheit (i.e., standard start-up temperature) throughout the start-up.

In the exemplary MPC based CC power plant start-up method represented by the curve 320, the control logic adjusts the operational parameters of the GT such that the exhaust gas temperature is 1000 degrees Fahrenheit. The control logic predicts the ST roll-off time as the $70^{th}$ minute from the time the CC power plant operation was started. The control logic then adjusts the operational parameters of the GT at the $50^{th}$ minute from the time the CC power plant operation was started, such that the ST roll-off permissives are satisfied at the $70^{th}$ minute.

Similarly, in the illustrated graph 350, the x-axis is represented by time measured in minutes and the y-axis is represented by the GT load measured in megawatts. In the standard CC power plant start-up method represented by the curve 355, the GT is operated such that the GT load is 18 megawatts (i.e., standard start-up load) throughout the start-up. In the exemplary MPC based CC power plant method represented by the curve 360, the GT is operated to generate a GT load of 50 megawatts. The control logic adjusts the GT operational parameters such that the ST roll-off permissives are satisfied at the predicted ST roll-off time ($70^{th}$ minute from the time the CC power plant operation was started).

Similarly, FIG. 4 illustrates graphs 400 depicting a comparison between operational data of a standard CC power plant start-up method and an exemplary MPC based CC power plant start-up method according to another embodiment. The illustrated graphs 400 represent the operational data of the CC power plant during a hot start. Typically, in a hot start, the temperatures of the ST components are higher than a cold start, due to a short period (for example, 45 minutes, two hours, or the like) of ST inactivity. In the illustrated graph 410, the x-axis is represented by time measured in minutes and the y-axis is represented by GT exhaust gas temperature measured in degrees Fahrenheit. In a standard CC power plant start-up method represented by the curve 415, in order to satisfy the roll-off permissives, the GT is operated such that the exhaust gas temperature is approximate 1075 degrees Fahrenheit (i.e., standard start-up temperature) throughout the start-up.

In the exemplary MPC based CC power plant start-up method represented by the curve 420, the control logic adjusts the operational parameters of the GT such that the exhaust gas temperature is 1150 degrees Fahrenheit. The control logic predicts the ST roll-off time as the $15^{th}$ minute from the time the CC power plant operation was started. The control logic then adjusts the operational parameters of the GT at the $7^{th}$ minute from the time the CC power plant operation was started, such that the ST roll-off permissives are satisfied at the $15^{th}$ minute.

Similarly, in the illustrated graph 450, the x-axis is represented by time measured in minutes and the y-axis is represented by the GT load measured in megawatts. In the standard CC power plant start-up method represented by the curve 455, the GT is operated such that the GT load is 45 megawatts (i.e., standard start-up load) throughout the start-up. In the exemplary MPC based CC power plant method represented by the curve 460, the GT is operated to generate a GT load of 50 megawatts. The control logic adjusts the GT operational parameters such that the ST roll-off permissives are satisfied at the predicted ST roll-off time ($15^{th}$ minute from the time the CC power plant operation was started).

The above described MPC based CC power plant start-up method is advantageous for at least two reasons. (a) Since the exhaust gas temperature is higher than the standard start-up temperature, the thermal energy transferred to the HRSG is higher. The higher thermal energy reduces the time taken by the CC power plant to start-up and reduces the amount of fuel used by the GT. (b) Since the GT is operated at a higher load when compared to the standard start-up GT load, the amount of emissions (i.e., Nitrogen Oxide, carbon monoxide, hydrocarbons, or the like) is reduced.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. What is claimed as new and desired to be protected by Letters Patent of the United States is:

The invention claimed is:

1. A method for operating combined cycle power plants, the method comprising: modifying one or more operational parameters of a gas turbine (GT) to increase an exhaust gas temperature above a standard start-up temperature; receiving at least one of GT operational data, heat recovery steam generator (HRSG) operational data, and steam turbine (ST) operational data from a plurality of sensors;
  predicting a time at which one or more ST roll-off the permissives are required to be satisfied based on at least one of the GT operational data, the HRSG operational data, and the ST operational data, wherein the prediction is based on a model of at least one of the GT, HRSG, or ST; and
  modifying the one or more operational parameters of the GT to satisfy the one or more ST roll-off permissives at the predicted time, wherein the ST roll-off permissives includes at least one of a temperature matching condition, a minimum pressure condition, and a minimum flow condition, and wherein modifying the one or more operational parameters of the GT comprises adjusting at least one of a fuel valve and an inlet guide vane.

2. The method of claim 1, further comprising modifying the one or more operational parameters of the GT to increase a GT load above a standard start-up load.

3. The method of claim 1, further comprising predicting the ST roll-off time using a model predictive control algorithm.

4. The method of claim 1, further comprising:
  determining whether the GT operational data are within one or more operational constraints; and modifying the one or more operational parameters of the GT in response to determining that the GT operational data exceed the one or more operational constraints.

5. The method of claim 1, further comprising:
determining whether the HRSG operational data are within one or more operational constraints; and
modifying one or more operational parameters of the HRSG in response to determining that the HRSG operational data exceed the one or more operational constraints.

6. The method of claim 5, wherein modifying the one or more operational parameters of the HRSG includes adjusting at least one of an HRSG attemporator and one or more bypass valves.

7. The method of claim 5, further comprising modifying the one or more operational parameters of the GT in response to determining that the HRSG operational data exceed the one or more operational constraints.

8. A system comprising:
a gas turbine (GT);
a heat recovery steam generator (HRSG) coupled to the GT;
a steam turbine (ST) coupled to the HRSG; and
a computing device communicatively coupled to the GT, the HRSG, and the ST, the computing device configured to:
modify one or more operational parameters of the GT to increase an exhaust gas temperature above a standard start-up temperature;
receive at least one of GT operational data, HRSG operational data, and ST operational data;
predict a time at which one or more ST roll-off permissives are required to be satisfied based on at least one of the GT operational data, the HRSG operational data, and the ST operational data, wherein the prediction is based on a model of at least one of the GT, HRSG, or ST; and
modify the one or more operational parameters of the GT to satisfy one or more ST roll-off permissives at the predicted off time, wherein the ST roll-off permissives includes at least one of a temperature matching condition, a minimum pressure condition, and a minimum flow condition, and wherein modifying the one or more operational parameters of the GT comprises adjusting at least one of a fuel valve and an inlet guide vane.

9. The system of claim 8, further comprising a plurality of sensors coupled to the GT, the HRSG, and the ST, the plurality of sensors configured to determine the GT operational data, the HRSG operational data, and the ST operational data.

10. The system of claim 8, wherein the computing device further modifies the one or more operational parameters of the GT to increase a GT load above a standard start-up load.

11. The system of claim 8, wherein the computing device predicts the ST roll-off time using a model predictive control algorithm.

12. The system of claim 8, wherein the computing device further determines whether the GT operational data are within one or more operational constraints and modifies the one or more operating parameters of the GT in response to determining that the GT operational data exceed the one or more operational constraints.

13. The system of claim 8, wherein the computing device further determines whether the HRSG operational data are within one or more operational constraints and modifies one or more operating parameters of the HRSG in response to determining that the HRSG operational data exceed the one or more operational constraints.

14. The system of claim 13, wherein the computing device modifies the one or more operational parameters of the HRSG by adjusting at least one of an HRSG attemporator and one or more bypass valves.

* * * * *